Aug. 21, 1962 K. L. BURGENER 3,050,592

MESSAGE WAITING INDICATING CIRCUITS

Filed Oct. 1, 1959 3 Sheets-Sheet 1

INVENTOR.
KARL L. BURGENER
BY
C. A. [signature]
ATTY.

Aug. 21, 1962 K. L. BURGENER 3,050,592

MESSAGE WAITING INDICATING CIRCUITS

Filed Oct. 1, 1959 3 Sheets-Sheet 2

INVENTOR.
KARL L. BURGENER
BY
C. A. Gulbrandsen
ATTY.

INVENTOR.
KARL L. BURGENER
BY C. A. Gulbrandson
ATTY.

3,050,592
MESSAGE WAITING INDICATING CIRCUITS
Karl L. Burgener, Villa Park, Ill., assignor to Automatic Electric Laboratories, Inc., a corporation of Delaware
Filed Oct. 1, 1959, Ser. No. 843,867
9 Claims. (Cl. 179—86)

This invention relates to telephone systems in general, and more particularly to methods of providing "message waiting" indications at telephone substations.

In some cases, such as in the use of a PBX or a PABX in a hotel or a motel, telephone calls to substations cannot be completed because of the absence of the called party. Many times the calling party desires to leave a message to be transmitted by the operator of the PBX or PABX to the called party upon his return. This might involve repeated attempts by the operator to reach the party for whom the message during his absence. This is not only time-consuming, but also may be very inconvenient for the switchboard operator in other respects. This task can be avoided by providing at each telephone substation in a hotel, motel, etc., a message-waiting signal to give the called party, upon his return, an indication that there is a message waiting for him. The called party can then place a call to the operator or message-waiting attendant to receive the message being held for him.

It is the general object of this invention to provide an improved message-waiting arrangement in a telephone system.

The object is attained, in accordance with a feature of the invention, by providing a visual signal at each telephone substation and a control device at an operator's position or at a message-waiting attendant's position by which the visual signal at the station can be energized over the line conductors in a series-aiding circuit including the exchange battery and a booster battery.

In accordance with another feature of the invention, in a particular embodiment of the invention, relays are provided to lock a voltage source to the substation line to maintain the visual signal device at the substation in an operated condition until the called party places a call to the message-waiting operator to receive the waiting message.

In accordance with another feature of the invention, a unidirectional-current-conducting device is provided for shunting-out the booster battery required for operation of the visual signal device, when the called party originates a call from his substation, so that the call can be made without interference from the special equipment required for operation of the visual signal device.

In accordance with another feature of the invention, an interrupter is provided to alternately connect and disconnect a booster battery from the substation line in order that the visual signal device at the substation will flash on and off and thereby be more attention-attracting to the called party.

The invention will best be understood by reference to the following description in connection with the accompanying drawings.

Figure 1:
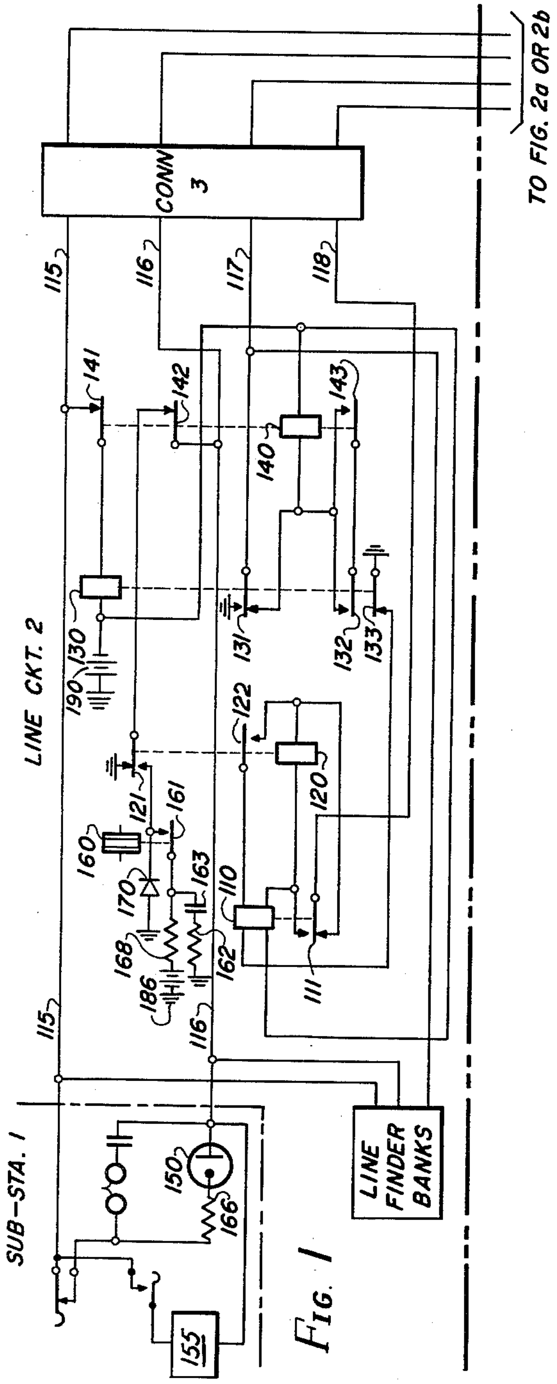

FIGURE 1 shows the message-waiting equipment associated with a PABX system, including substation 1, line circuit 2 and connector 3.

Figures 2A, 2B:
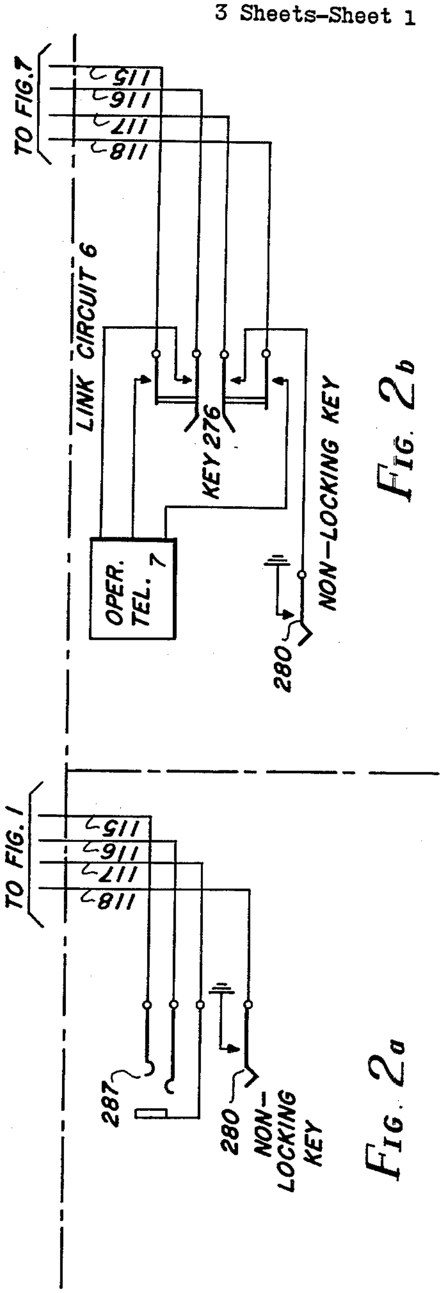

FIGURE 2*a* shows a connector multiple for use with FIG. 1 to permit the operator to dial through connector 3 to line circuit 2 and substation 1 and operate the message-waiting equipment.

FIGURE 2*b* shows the message-waiting equipment associated with a dial-type attendant's cabinet having a link circuit by means of which the operator can connect her telephone to a connector switch which enables her to dial the number of the substation, and therefore operate a key to cause the visual signal device at the substation to be operated.

Figure 3:
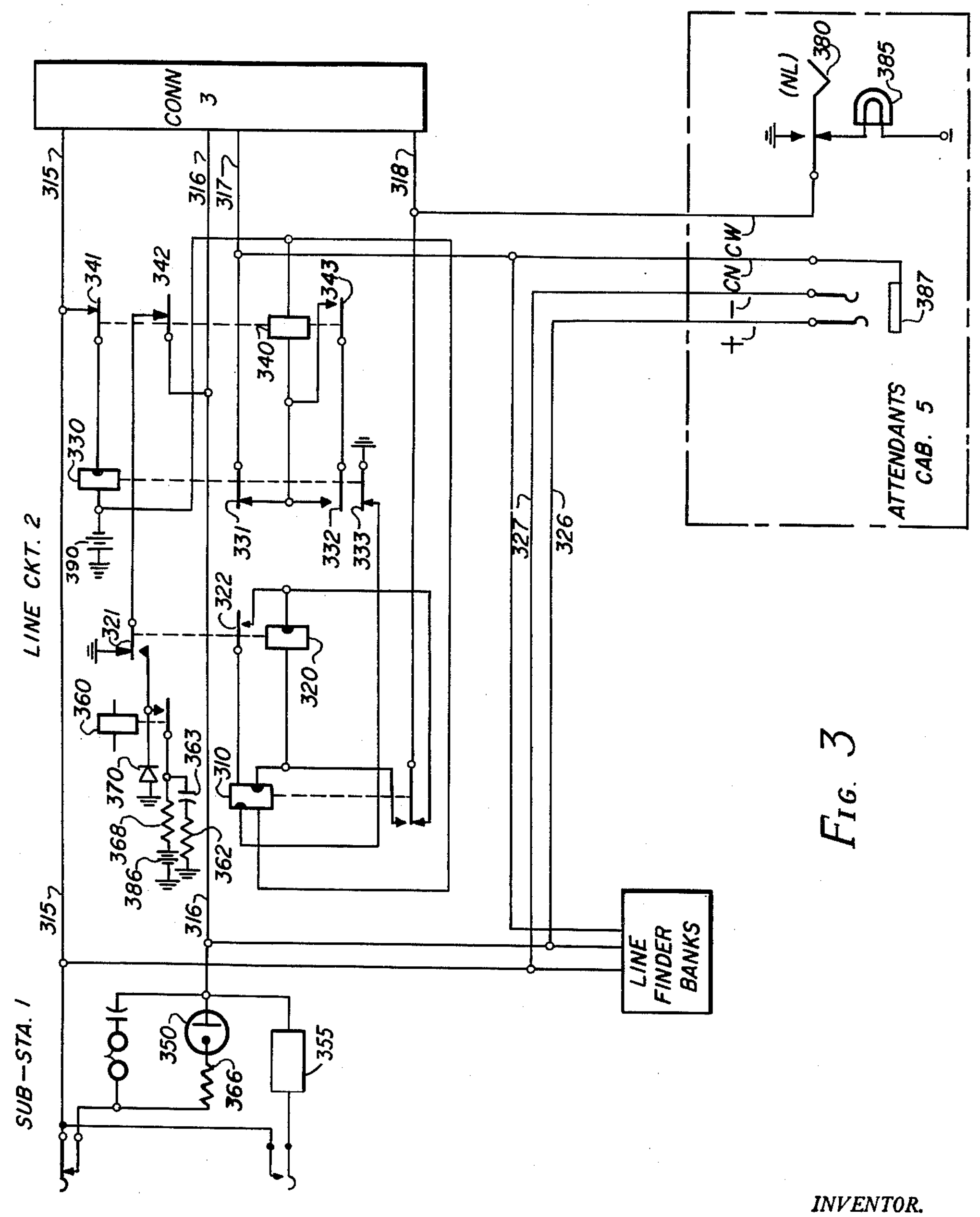

FIGURE 3 shows the message-waiting equipment associated with a PABX system, in which an operator has direct access to the substation and can operate a key to cause the visual signal device at the substation to be operated.

Figure 4:
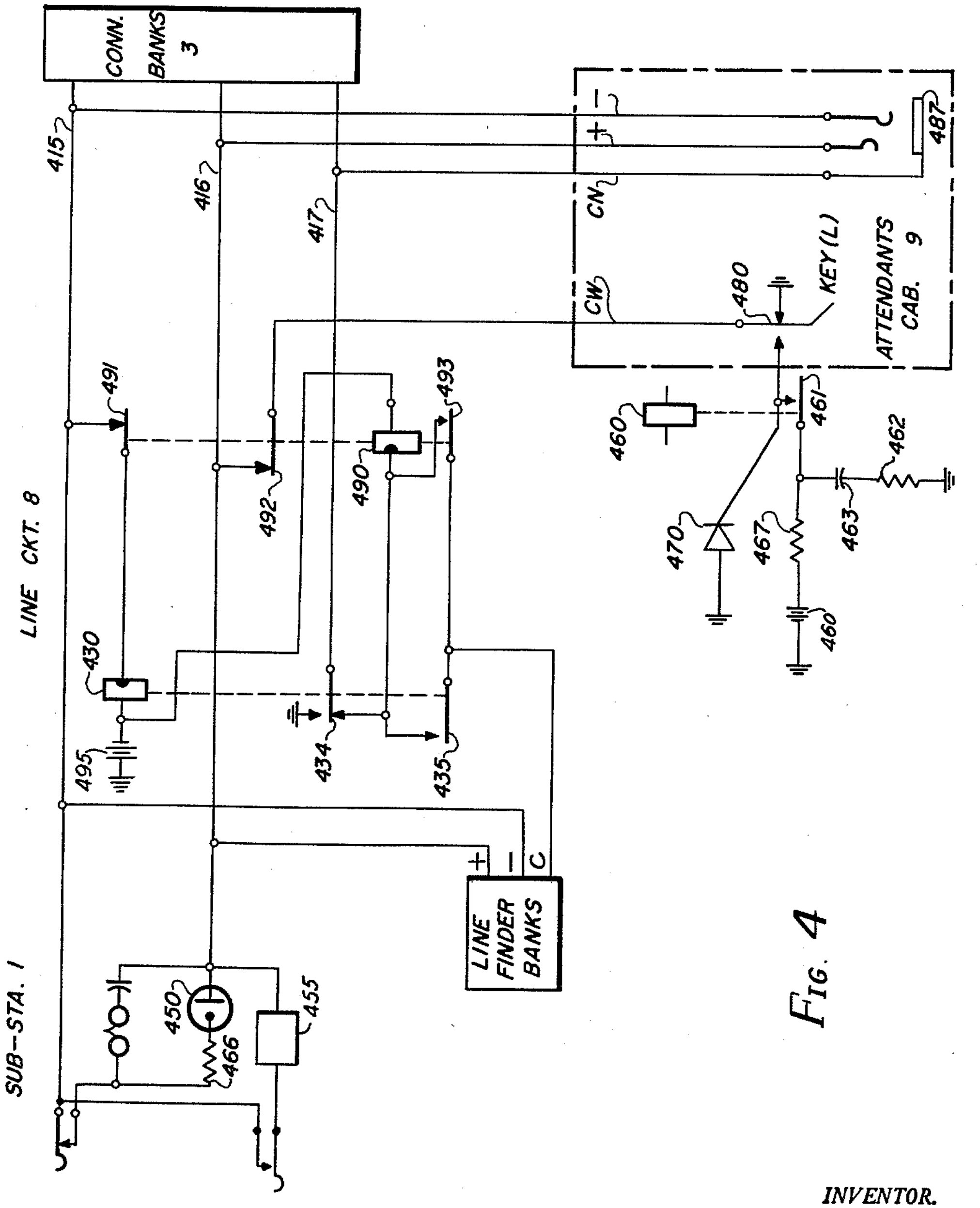

FIGURE 4 shows the message-waiting equipment associated with a PABX sytem including substation 1, line circuit 8, and attendant's cabinet 9, line circuit 8 being somewhat different from line circuit 2 in FIG. 1.

First consider the arrangement shown by combining FIGURES 1 and 2*a*. In this arrangement the series connection of visual signal device 150, a gas-filled lamp of the neon type, and resistor 166 is shunted across substation line conductors 115 and 116. The operator of the PABX system has access to substation 1 by means of jack 287 at the operator's position shown in FIGURE 2*a*, through connector 3 and line circuit 2, over line conductors 115 and 116. Connector 3 may be any well-known four-wire connector switch, such as an executive right-of-way type connector, as shown in U.S. Patent 2,735,892 to R. W. Jones. When the operator desires to extend a call to substation 1, she inserts jack 287 into conductors 115 and 116 and dials up connector 3 which extends a connection to substation 1. Assuming that there is no one present at substation 1, but that the calling party desires to leave a message for the called party, the operator will now want to operate the message-waiting equipment so that a visual signal will be present when the called party returns, indicating to him that there is a message waiting for him. To do this, the operator depresses key 280, a non-locking key. Depressing key 280 makes contact with ground potential at the key position. This ground potential is extended over conductor 118, through connector 3, contact 111 in line circuit 2, the winding of relay 120, and the lower winding of relay 110 to battery potential. This completes the circuit to the winding of relay 120, and relay 120 operates, closing contacts 121 and 122. The circuit to the lower winding of relay 110 is completed also, but the closing of contact 122 on relay 120 places ground potential from key 280, over conductor 118, and contact 111 on one side of the upper winding of relay 110, and ground potential is on the other side of relay 110 from contact 133, so that relay 110 is prevented from operating. When contact 121 closes, booster battery 186 and resistor 168 are connected to line conductor 116. When the operator releases non-locking key 280, ground potential is removed from conductor 118, and is replaced by battery potential through signal lamp 150. Removal of this ground potential from conductor 118 removes ground from one side of the upper winding of relay 110 and permits relay 110 to operate. Contact 111 closes, locking up, in an operated condition, relays 110 and 120. The connection of booster battery 186 and resistor 168 to line conductor 116 places booster battery 186 in series-aiding with the regular exchange battery 190. The voltage of booster battery 186 preferably is about 50 volts, approximately the same as the voltage of the regular exchange battery 190. Neon lamp 150 has an ignition potential in excess of 50 volts, but less than 100 volts, so that the sum of the voltages of the booster battery and the exchange battery is sufficient to ignite neon lamp 150. Thus, when relay 120 operates to connect booster battery 186 in series with exchange battery 90, sufficient voltage is applied to neon lamp 150 to cause it to ignite and glow. An interrupter circuit, shown by relay 160 and contact 161, may be inserted in series with booster battery 186 in order to make neon lamp 150 flash intermittently and thereby be more attention-arresting.

Since there is ground potential between the series connection of booster battery 186 and exchange battery 190, the full series voltage, approximately 100 volts, does not appear on one side of the substation line, but rather, approximately 50 volts is applied to each side of the substation line, comprising conductors 115 and 116. Thus application of a high voltage of approximately 100 volts on one side only of the substation line is avoided. In this way, the attendant dangers of applying a relatively high voltage to one side of a line are obviated.

When the called party at substation 1 returns and, seeing message-waiting lamp 150 lighted, places a call to the operator to receive the message waiting for him, the resistance of the transmitter-receiver of set 155 is shunted across the line.

The resistance of the transmitter-receiver is relatively very small compared with that of lamp 150 and resistor 166, so that line relay 130 will operate over contact 141, the transmitter-receiver at substation 1, contact 142, contact 121, resistor 168, and booster battery 186 to ground. Diode 170 provides a by-pass path around booster battery 186 when transmitter-receiver is lifted, thus making resistance 168 non-critical in the operation of line relay 130. Operation of relay 130 opens contact 133, which removes ground from the lower winding of relay 110 and from the winding of relay 120, causing these relays to release. Release of relay 120 restores ground potential at contact 121. Neon lamp 150 at substation 1 is extinguished and will remain extinguished until such time as the operator at position 4 may have cause to again operate key 180 and again place the message-waiting lamp 150 in operation at substation 1.

A second arrangement may be provided by combining FIGURES 1 and 2*b*. FIGURE 2*b* shows a dial-type attendant's cabinet. In this arrangement the operator can extend a connection to substation 1 by means of link circuit 6 and connector 3. When a call is to be extended to substation 1, the operator depresses key 276, which is of the locking type, to establish a link between her telephone 7 and connector 3. The operator can then dial the number of substation 1. If no one answers at substation 1, but the calling party wishes to leave a message with the operator to be transmitted to the called party, the operator can momentarily depress non-locking key 280, and the message-waiting equipment is operated in the same manner as described for FIGURE 1, and the neon lamp at substation 1 is lighted. Similarly, the equipment is released in the same way as in FIGURE 1.

In FIGURE 3 the operator has access to substation 1 directly by means of station multiple 5, rather than by a connector multiple as shown in FIGURE 2*a*. In this arrangement the operator at position 5 need only insert jack 387 into conductors 326 and 327 and apply ringing current in order to establish a connection to substation 1. If then the operator gets no answer from the called party, and a message is left with the operator to be transmitted to the called party, the operator depresses key 380 momentarily, and the message-waiting equipment is activated in the same manner as described for FIGURE 1, the exchange battery 390 is connected in series-aiding with the booster battery 386, and the neon lamp at substation 1 is lighted. Similarly, the equipment is released in the same way as in FIGURE 1.

In FIGURE 4 key 480 is a locking key, rather than a non-locking key. In this arrangement the operator has direct access to substation 1, and can extend a call to substation 1 over conductors 415 and 416 by means of jack 487. If the called party is not present and the calling party wishes to leave a message with the operator to be transmitted to the called party, the operator can place the message-waiting equipment in operation by depressing key 480. This connects booster battery 460 to the line circuit over a path from ground, through booster battery 460, resistor 467, interrupter contact 461, key 480 and contact 492. The circuit loop is completed through neon lamp 450, resistor 466, contact 491, line relay 430, to exchange battery. This places booster battery 460 in series-aiding with exchange battery 495, and causes neon lamp 450 to light. This lamp is made to flash intermittently by interrupter contact 461. The lamp will continue flashing until either locking key 480 is released by the operator or someone at substation 1 initiates a call. In the latter case, when the handset at substation 1 is lifted, a greatly increased current flow through line relay 430, since the impedance of the transmitter-receiver is much smaller than the impedance of neon lamp 450 and resistor 466. This causes line relay 430 to operate. In addition, the much lower impedance of the handset effectively shunts out high-resistance neon lamp 450, and thus neon lamp 450 will be extinguished when the handset is lifted. Diode 470 is connected so that it does not interfere with the operation of the message-waiting equipment, yet provide a by-pass path around booster battery 460 when a call is initiated at substation 1, allowing the greatly increased current to pass through diode 470 rather than through booster battery 460. If the call is initiated to the operator to receive the waiting message, the operator will release key 480 upon receipt of the call so that the message-waiting equipment will be disconnected from the line. However, if a call is initiated to some party other than the operator, and the message is not delivered to the party for whom it is waiting, the operator will not have released key 460 and neon lamp 450 will again begin flashing when the handset at substation 1 is replaced after the completion of the call, and will continue to do so until the operator has been contacted to relay the message and has released key 480 in order to disconnect the message-waiting equipment. It is not necessary to provide a separate diode 470 for each substation; one such diode is common to a group of substations.

While particular embodiments of the invention have been shown and described, various modifications within the scope of the invention can, of course, be made by those skilled in the art.

What is claimed is:

1. In a telephone message-waiting system, a telephone line, a substation at one end of said line, a first source of voltage connected to one side of said line for normal operation of said substation, a relatively high-impedance circuit including a visual signal device bridged across said line at said substation, said device being operative only on a voltage greater than that of said first voltage source, a relatively low-impedance circuit connectable across said line at the substation, a second source of voltage connectable to the other side of said line, and manually-controlled means at the opposite end of said line for connecting said first and second sources of voltage in a series-aiding circuit including said line and said device, thereby operating said device with said low-impedance circuit disconnected from the line.

2. In a telephone message-waiting system, the combination as claimed in claim 1, wherein one terminal of each said first and second voltage source is connected to a common potential, wherein said one side of the line is normally connected to the line terminal of said first voltage source and said other side of the line to said common potential, and wherein actuation of said manually-controlled means causes said other side to be switched from said common potential to the line terminal of said second voltage source.

3. In a telephone message-waiting system, the combination as claimed in claim 1 in which there is further provided means, comprising a unidirectional current conducting device which are common to a plurality of said lines and connected generally in shunt relation to said second voltage source, said means providing a by-pass around said second voltage source during connection of said low-impedance circuit across said line at said substation.

4. In a telephone message-waiting system, the combination as claimed in claim 1, in which said manually-controlled means comprise a plurality of relays in the line circuit of said line, said relays being operative responsive to a momentarily applied control potential at said opposite end of said line for completing said series-aiding circuit, and means for locking said relays so that following the removal of said control potential said series-aiding circuit is maintained.

5. In a telephone message-waiting system, the combination as claimed in claim 4, in which there is included a manually-operated non-locking key at an operator's position at said opposite end of said line for momentarily applying said control potential, for causing said relays to operate, in which said key is individual to said line circuit, and in which an indicating lamp is provided at said operator's position for giving an indication to the attendant at said operator's position of the operated condition of said visual signal device at said substation, said indicating lamp being connected to the normal position of said key.

6. In a telephone message-waiting system, the combination as claimed in claim 4, in which there is included a plurality of connector switches common to a plurality of lines, including said line, and a manually-operated non-locking key at an operator's position at said opposite end of said line, said key being common to said plurality of lines, and said key being operable by the attendant at said operator's position for momentarily applying said control potential by way of one of said connector switches to a selected one of said line circuits, whereby said relays in said selected line circuit are caused to operate.

7. In a telephone message-waiting system, the combination as claimed in claim 1, in which said manually-controlled means comprises a locking key individual to said line circuit, operation of said key directly connecting said second source of voltage in series with said first source of voltage, and in which there is included an interrupter to alternately connect and disconnect one of said sources of voltage from said line, thereby causing said visual signal device to be alternately operated and unoperated.

8. In a telephone message-waiting system the combination as claimed in claim 7, wherein each said voltage source has a terminal connected to a common reference point; said locking key has a first contact for connection to said other side of said line, and a second contact closed to the first contact in the operated position of the key; said second voltage source is connected through contacts of said interrupter to said second contact; and further including a unidirectional current conducting device connected from said second contact to the reference point and poled so that with the interrupter contacts open it is forward biased by the first voltage source, so that during connection of said low-impedance device at said substation the unidirectional device provides a shunt path to by-pass the interrupter contacts and second voltage source.

9. In a telephone message-waiting system, a plurality of lines having individual line circuits, a plurality of connector switches common to said plurality of lines, a substation at one end of one of said lines, a source of first voltage connected to one side of said line for normal operation of said substation, a relatively high-impedance circuit including a visual signal device bridged across said line at said substation, said device being operative only on a voltage greater than said first voltage, a relatively low-impedance circuit connected across said line at the substation, relay means in the line circuit of said line for applying a voltage greater than said first voltage to said line for operating said device, a manually operated non-locking key at an operator's position, said key being common to said plurality of lines, and said key being operable by the attendant at said operator's position for momentarily applying said control potential by way of one of said connector switches to a selected one of said line circuits, said relay means being operated responsive to the momentarily applied control potential, means for locking said relay means to remain operated following the removal of said control potential, means responsive to the relay means being operated for applying said greater voltage to said line, with said low-impedance circuit disconnected from the line, thereby operating said device.

References Cited in the file of this patent

UNITED STATES PATENTS

| | | |
|---|---|---|
| 2,275,352 | Durante | Mar. 3, 1942 |
| 2,884,491 | Breen | Apr. 28, 1959 |